March 21, 1961 R. F. BURLINSON ET AL 2,975,639
INSTRUMENT WITH MAGNETIC COUPLING
Filed June 1, 1956 4 Sheets-Sheet 1

INVENTORS
ROY F. BURLINSON
DONALD A. BROCKMAN
PHILIP M. TAYLOR
LLEWELLYN YOUNG
BY Arthur L Wade
ATTORNEY

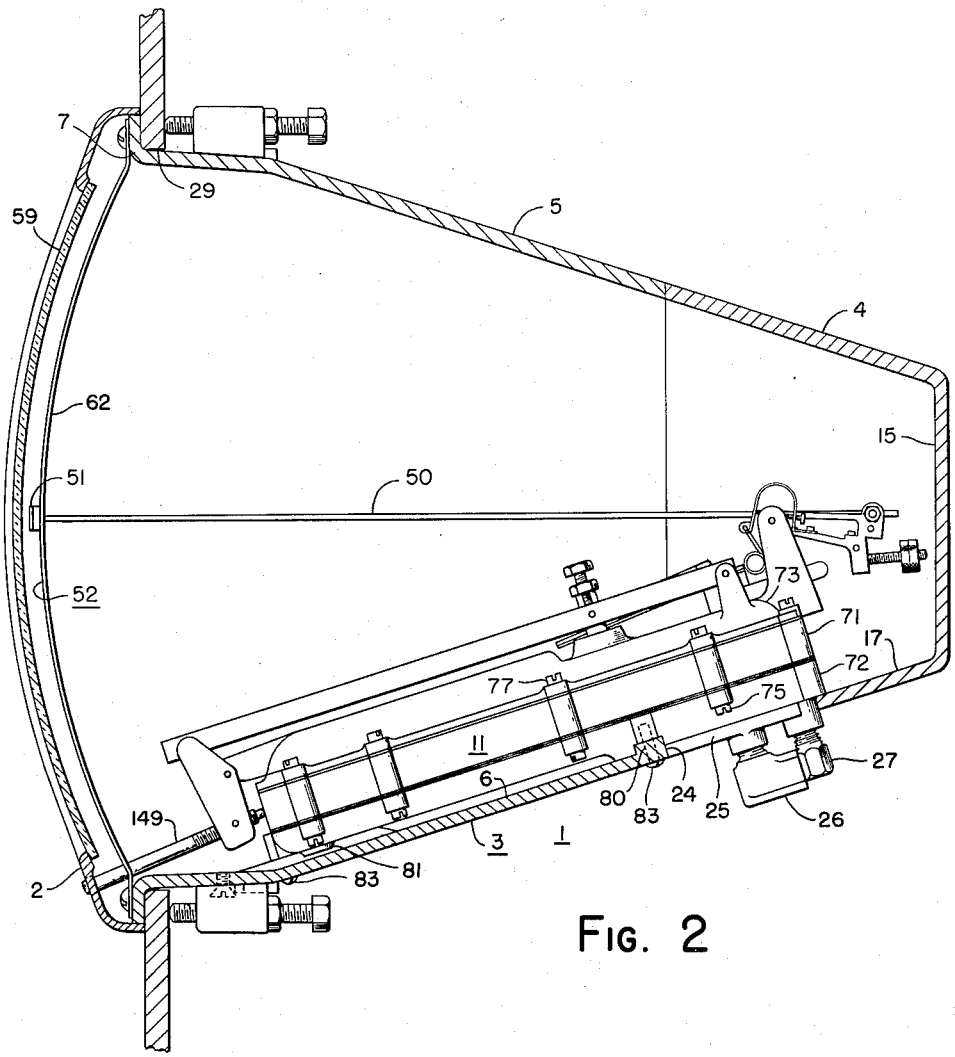

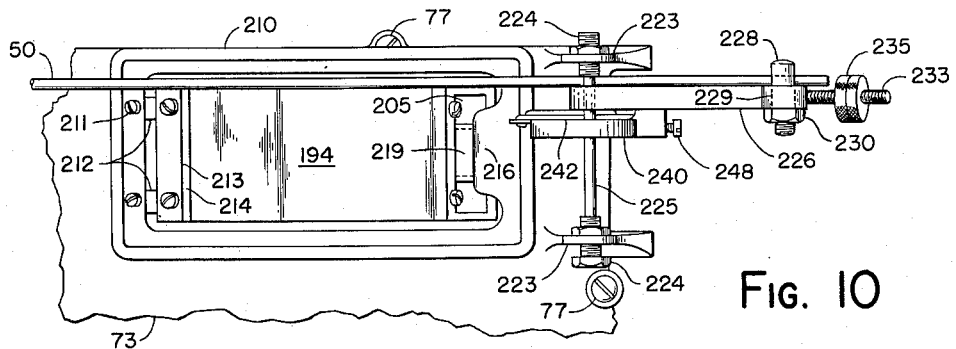
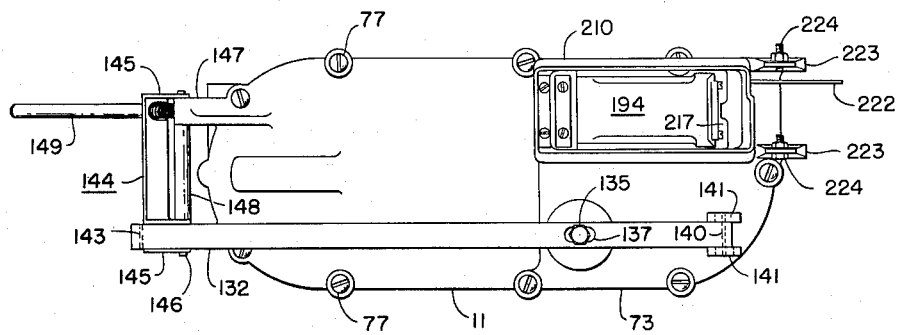
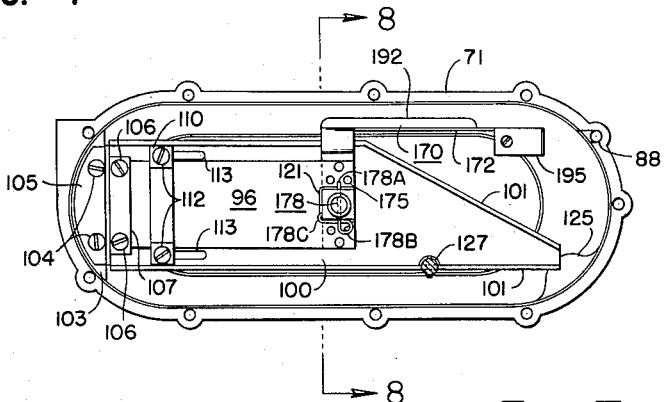
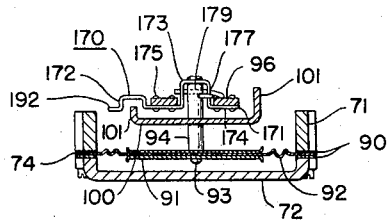

United States Patent Office 2,975,639
Patented Mar. 21, 1961

2,975,639
INSTRUMENT WITH MAGNETIC COUPLING

Roy Frederick Burlinson, London, Donald Alan Brockman and Philip Maurice Taylor, Shirley, and Llewellyn Young, Croydon, England, assignors to Bailey Meter Company, a corporation of Delaware Filed June 1, 1956, Ser. No. 588,910

6 Claims. (Cl. 73—407)

This invention relates to indicating or/and recording instruments or relays, an object being the provision of improved instruments or relays of the kind having means within a casing responsive to a variable and adapted to act through a magnetic coupling to effect operation of a device outside the casing. In such instruments or relays the undesirable forces inseparable from mechanical transmitting means passing in fluid-tight manner through a casing are avoided. The difficulty arises, however, that there is a tendency for the part of a magnetic coupling outside a casing to lag in its movements behind the part of the coupling inside the casing. An improvement of the magnetic coupling lessening such lag or hysteresis would give a greater accuracy of the instrument or relay particularly when the total available movement within the casing is small. In practice, moreover, the force which may be transmitted through a magnetic coupling is small and advantageously the operating force required of the part outside the casing should be reduced as far as possible, whilst the force which may be transmitted should be increased as far as practicable.

In an indicating or/and recording instrument or relay having means within a casing responsive to a variable and adapted to act through a magnetic coupling to effect operation of a device outside the casing, the coupling comprising parts linked by magnetic flux and disposed respectively inside and outside the casing, according to the present invention, at least one of the parts includes a permanent magnet the poles of which are spaced relatively to one another in the direction of movement of the said part and at least the part outside the casing is mounted on means including a pivot of the spring blade type.

The invention will now be described, by way of example, with reference to the accompanying partly diagrammatic drawings, in which:

Figure 2 is a sectional side elevation taken on the line 2—2 of Figure 1 and viewed in the direction indicated by the arrows;

Figure 4 is a plan view of the pressure sensitive instrument;

Figure 7 is a plan view of the pressure sensitive instrument with a cover part, and parts attached thereto removed;

Figure 8 is a sectional front view taken on the line 8—8 of Figure 7 and viewed in the direction indicated by the arrows;

Figure 10 is a plan view of the mechanism shown in Figure 9;

Figure 1:
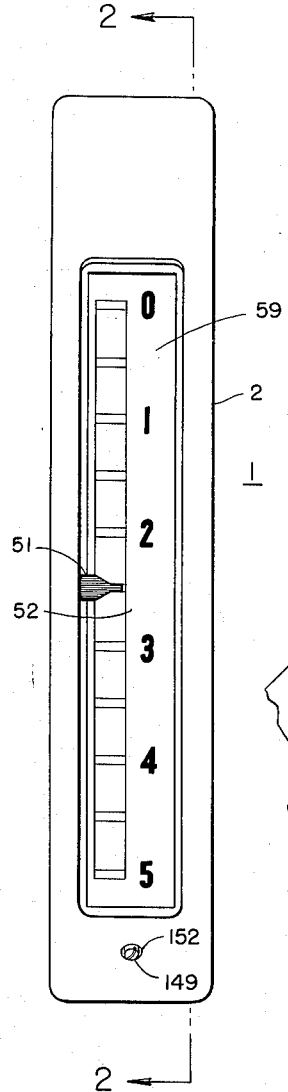
Figure 1 is a front view showing an instrument assembly.

The instrument assembly shown in Figures 1 to 10 of the drawings comprises a housing 1 that contains an instrument 11 and includes a front cover 2, an intermediate instrument and housing supporting part 3 and a rear cover 4, removal of which gives access to the instrument. The intermediate part 3 is formed with parallel side walls and with upper and lower walls, 5 and 6 respectively, which converge rearwardly. At the front of the intermediate part 3 is a peripheral outwardly extending flange 7 formed with suitable screw holes (not shown) for securement of the front cover 2.

The instrument 11 is a pressure sensitive instrument which is bolted to the lower wall 6 of the housing.

Between the end of lower wall 17 of the rear cover and the bottom of the intermediate part 3 is an aperure 24 occupied by a projecting platform 25 on the base of the instrument 11 carrying nipples 26 and 27 for the application of the actuating fluid to the instrument.

The instrument 11 is arranged to actuate an index in the form of a tubular indicating pointer 50 of lightweight metal that carries at its forward end a flag 51 which cooperates with an arcuate upwardly extending scale 52, secured at its top and bottom to the flanges 7 of the casing, to give an indication of a difference between two pressure applied to the instrument 11 through nipples 26 and 27 respectively. The front cover 2 incorporates a transparent scale window 59 through which the scale 52 and the flag 51 may be viewed.

The instrument 11 is a diaphragm operated instrument having an elongated diaphragm and an elongated casing the longitudinal axis of which extends rearwardly away from the associated scale.

The casing of instrument 11 comprises an intermediate part or spacer 71 of frame-like form, a base 72 formed with a peripheral upstanding flange adapted to register with the spacer and a top or cover 73 also formed with a peripheral flange adapted to register with the spacer. A diaphragm 74 is clamped between the base 72 and the spacer 71 by screws 75 passing through the base 72 and screwing into threaded holes 76 in the spacer. The cover 73 is also clamped, by screws 77, to the spacer 71, an intermediate gasket (not detailed) being provided for forming a fluid-tight joint. At the rear of the base 72 is the projecting platform 25.

The underneath of the base 72 is formed with bearing surfaces 78 and 81 such that the instrument may be accurately positioned relative to the housing wall 6 and the instrument is clamped to the housing wall by three screws 83 which screw into holes provided in the base 72.

In the platform 25 are two threaded holes respectively for the nipples 26 and 27, the nipple 26 having communication with space 87 between the base 72 and the diaphragm 74 and the nipple 27 having communication by way of a duct 88 (see Figure 9) in the spacer 71 with space 89 between the cover 73 and the diaphragm 74. By means of the nipples 26 and 27 appropriate pipe connections may be made to the instrument.

The edge portion of the diaphragm 74 is sandwiched between gaskets 90 and is clamped between the base 72 and the spacer 71 and the central portion of the diaphragm 74 is sandwiched between a pair of clamp plates 91 so shaped as to leave free an annular part 92 of the diaphragm that lies between the edges of the clamp plates and gaskets 90. A number of screws clamp together the diaphragm clamp plates 91 and one of these, 93, secures in position a rod 94 projecting at the centre of the diaphragm from the diaphragm clamp plates towards the cover 73 and connected by means including a transverse pin 178 to a diaphragm biassing leaf spring 96. The base 72 of the casing is penetrated by a screw (not shown) adapted by engaging the lower clamp plate suitably to limit downward diaphragm travel.

The biassing spring 96 is mounted on an adjustable support which is in the form of a beam 100 formed at its sides with upstanding flanges 101. The beam 100 is supported at its rear end by means of a short leaf spring 102, the rear end of which is secured to a shelf 103, formed on the casing spacer 71, by means of two screws 104 passing through holes in a clamp plate 105 and the short spring 102 and screwing into holes in the shelf 103. The rear end of the beam 100 is rigidly secured to the short spring 102 and to the biassing spring 96 by two countersunk screws 106 passing from above through an upper clamp bar 107, the biassing spring 96, a fixed spacer bar 108, the short spring 102, and the beam 100 and screwed at their lower ends into holes in a fixed spacer bar 109 positioned below the beam 100.

Means are provided for varying the effective rate of the biassing leaf spring 96. Thus disposed transversely of the biassing spring 96 and above the spring is a movable clamp bar 110 immediately below which, between the spring 96 and the beam 100, is a movable spacer 111. The clamp bar 110 and the spacer 111 are wider than the leaf spring 96 and two countersunk screws 112 extend downwardly through holes in the movable spacer 111, respectively through slots 113 in the beam 100 and screw at their lower ends into a movable lower clamp bar 114 positioned below the beam 100. The slots 113 extend in the direction of the length of the spring 96 and by slackening the screws 112 the assemblage of upper clamp bar 110, spacer 111 and lower clamp bar 114 may be slid longitudinally of the biasing spring 96 and, by tightening of the screws 112, locked in a selected position in which the part of the spring 96 which lies rearwardly of the clamp bar 110 has the desired rate.

The beam 100 is formed with an aperture 120 larger than the rod 94 which projects from the diaphragm plates so that the rod 94 extends freely through the beam 100. The rear end part of the biassing spring 96 is formed with a central slot 121 which lies immediately above the aperture 120.

It will be appreciated that the short spring 102 serves as a pivot for the beam 100; downward rocking movement of the beam is limited by a stop 125 formed integrally with the casing spacer 71 and upward rocking movement is limited by engagement of the free rearward end of the beam with the casing cover 73.

The beam 100 is spring-biased in a downward direction by a helical compression spring 126 (see Figure 6) arranged to act between the casing cover 73 and the beam, and of such stiffness that deflection of the diaphragm biassing spring 96 is ineffective to cause movement of the beam 100. The beam may be moved against the force of the spring 126 by a link rod 127 of circular cross-section hingedly connected at its lower end by a pin 128 to one of the side flanges 101 of the beam 100, the rod 127 extending axially upwards through the spring 126, through a sealing washer 130 trapped between the upper end of the spring 126 and the cover 73, and through an aperture 131 formed in the casing cover. At its upper end the rod 127 is pivotally connected to a lever 132 which is of inverted channel shaped cross-section and is disposed above the casing cover, the link rod being formed at its upper end with a screw-threaded axial bore 133 and being transversely slotted to take the transverse pivot pin 134. The pin 134 is retained in the bore by a screw 135 screwed into the threaded bore and locked in adjusted axial position by a locknut 136. The lever 132 is formed with an aperture 137 through which the upper part of the rod 127 extends with a considerable clearance.

Figure 3:
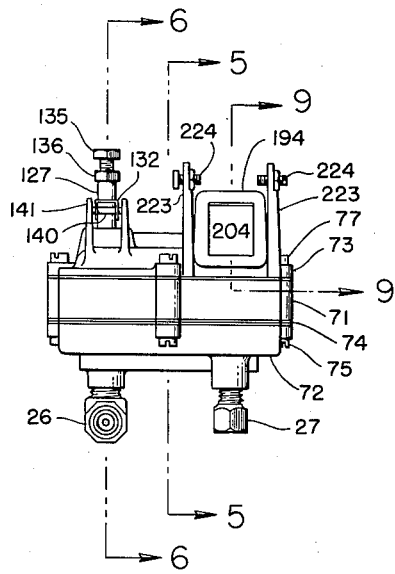
Figure 3 is a rear view of the pressure sensitive instrument shown in Figure 2 the pointer and associated parts being removed.

The lever 132 extends longitudinally of the casing cover 73 and towards one side thereof, as is shown most clearly in Figure 3, and is supported by a fixed pivot pin 140 provided towards the rear end of the casing cover and extending between lugs 141 upstanding from the casing cover, the side flanges of the lever 132 being notched to engage the pin.

Near its forward end the lever 132 is supported by an abutment 143 which may be moved to rock the lever about the fixed pivot pin 140, the abutment being provided on a rocker 144 which includes parallel, spaced arms 145 by means of which the rocker is pivotally mounted on a pivot pin 146 mounted on lugs 147 formed integrally with the casing cover 73, and pivotally mounted on the arms 145 is an element 148 of cylindrical form formed with a transverse screw-threaded hole into which is screwed an adjusting screw 149, the rearward end of which bears against the casing spacer 71. It will be seen that the rocker 144 is in effect a double armed lever, the abutment 143 being to one side of the pivot pin 146 and the element 148 being mounted to the other side of the pin 146. The element 148 is formed at its ends with trunnions that fit respectively into a hole in one of the arms 145 and into a rearwardly extending slot in the other arm, so that the element is readily removable from the rocker 144.

From the above description, it will be appreciated that the adjusting screw 149 may be variably oriented in relation to the rocker 144; when the instrument 11 is mounted in the housing 1, the screw 149 projects through a hole 152 in the front cover 2 and through its engagement with the sides of the hole the appropriate orientation of the screw 149 is maintained.

When the instrument 11 is mounted in the housing 1, rotation of the adjusting screw 149 will cause rotary movement of the rocker 144 so that the abutment 143 causes the lever 132 to rock on its pivot pin 140 and through the pin 134 either cause the link rod 127 to rise and draw the beam 100 upwards against the effect of the spring 126, or permit the link rod 127 to fall under the effect of the spring 126 acting through the beam 100. Furthermore, a coarse adjustment of the position of the beam 100 relative to the casing of the instrument 11 may be obtained by slackening of the locknut 136, adjustment of the screw 135 and retightening of the locknut 136.

Since the diaphragm biassing spring 96 is mounted on the beam 100, pivotal movement of the beam 100 in the manner described will effect movement of the rearward end of the spring 96 in the direction of the axis of the rod 94, and thereby, through pointer operating mechanism, described below, coupling the rod 94 to the indicating pointer 50, effect repositioning of the flag 51 relative to the scale 52.

With the adjusting mechanism described above, the coarse adjustment obtained by adjustment of the screw 135 may be utilised to determine whether the flag 51 shall have its normal or zero position at one end, at the other end or at a mid-point of the scale 52, whilst a fine adjustment of the flag 51 to its zero point may be obtained by rotation of the adjusting screw 149, which is accessible from the front of the instrument panel with the instrument assembly in its operative position.

The construction and operation of the pointer mechanism interposed between the rod 94, which is attached to the diaphragm 74, and the pointer 50 may be most clearly seen from Figures 7 to 10 of the drawings.

The instrument 11 includes an element coupled with the diaphragm and adapted to move with the diaphragm when that diaphragm is subjected to a pressure difference. The element is in the form of an arm 170 including a transverse part 171 secured to the free rearward end of the biassing spring 96 and a main part 172 offset in relation to the spring and extending rearwardly away from the pivotal mounting of the beam 100. The transverse part 171 includes a channel-like central portion 173 (see Figure 8) arranged to extend upwardly through the central slot 121 in the spring 96 with the adjacent portions 174 disposed below the spring 96 and secured by respective groups of three rivets 175 to the parts of the spring 96 which lie on opposite sides of the slot 121. The base of the channel-like portion 173 is formed with an aperture 176 for the accommodation of the upper end of the rod 94 whilst the sides of the channel-like portion 173 are formed with holes 177 for the passage of a straight end portion 178A of a pin 178 which passes through those holes and through a corresponding hole 179 in the rod 94 (see Figure 8). Beyond the straight portion 178A, the pin 178 is bent around to one side in a complete loop 178B and projects on the other side of the straight portion 178A at first normally thereto and then as an S-like portion 178C extending towards that end of the straight portion 178A which is remote from the loop portion 178B. As shown in Figure 7, with the straight portion 178A extending through the holes 177 and 179, the end part of the portion 178C of S-like form is sprung past a side of the channel-like portion 173 into the space between the two sides of that portion 173 so that the pin is secured in position. Since the pin 178 is of circular cross-section and of small diameter, force is transmitted from the rod 94 to the arm 170 with very little friction.

The main part 172 of the arm 170 is formed, near the biassing spring 96, with an edge strengthening flange 192 and the rearward portion 193 of the arm 170 is cranked upwardly in order suitably to position a rearward end part within an upstanding hollow projection 194 formed on the casing cover 73 adjacent the side thereof remote from the link rod 127.

The rearward end part of the arm 170 is bent over along its upper edge to form a shelf 195, to the underside of which is secured a permanent magnet assembly 196 clamped to the shelf 195 by a clip 197 and cemented in position. The arm 170 and the clip 197 are formed from low permeability material, suitably austenitic stainless steel.

The magnet assembly 196 comprises a relatively thick plate or block 200 of the ceramic permanent magnet material known as "Magnadure" sandwiched between two plate pole pieces 201 of high permeability material. As shown most clearly in Figure 9, the plate pole pieces 201 extend beyond the edges of the plate 200 and the rearward edges of the two pole pieces 201 both lie in the plane of a machined planar face 203 which surrounds a window 204 formed in the rearward end of the projection 194. The window 204 is closed in a pressure-tight manner by a thin diaphragm 205 of suitable low permeability material sandwiched between two gaskets 206 and clamped to the face 203 by a retaining plate 207 and clamping screws. Since one of the gaskets 206 is positioned between the diaphragm 205 and the face 203, a small clearance exists between the rearward edges of the pole pieces 201 and the diaphragm 205.

As seen in plan view, the projection 194 is rectangular in shape, and a magnet tray 210 moulded from lightweight material and formed by a rectangular frame the sides of which are of L-shaped cross-section loosely embraces the projection 194 and at its forward end is clamped by bolts 211 to two short, weak, spring strips 212 that at their rearward ends are clamped under a bar 213 to a transverse shelf 214 on the outside of the casing cover 73 at the forward end of the projection 194. The forward side of the tray 210 is formed with a shelf 216 to which is cemented a magnet assembly 217 similar to that secured to arm 170 and comprising a plate 218 of permanent magnet material sandwiched between and cemented to two pole pieces 219 of high permeability material. It is to be noted that the distance between the pole pieces 219 is equal to the distance between the pole pieces 201, and that the plates 200, 218 of permanent magnet material are so oriented that the upper pole piece 201 is of north-seeking polarity, the upper pole piece 219 is of south-seeking polarity, the lower pole piece 201 is of south-seeking polarity and the lower pole piece 219 is of north-seeking polarity. The tray 210 is assembled in position after the diaphragm 205 has been clamped in position and is adjusted by movement of the spring strips 212 under the clamp bar 213, the holes in the spring strips through which the clamping screws pass being elongated, so that over a desired limited range of rocking movement of the tray 210 on the pivot formed by the spring strips 212, representing the operating range of the instrument, the pole pieces 219 have a very small clearance from the diaphragm 205.

Advantageously the diaphragm 205 should be of material having a high co-efficient of mechanical elasticity so that a very thin diaphragm may be employed as a seal against a wide range of pressure differences without deflecting sufficiently to interfere with the magnet pole pieces. A suitable material is austenitic stainless steel which allows the end faces of the pole pieces 201 and 219 to be separated by a very small clearance.

In the magnetic coupling described above, an almost closed magnetic circuit is constituted by two permanent magnets and their associated pole pieces, with the result that a strong magnetic field is produced with a relatively lightweight magnetic system. The pole pieces serve substantially to concentrate the flux in narrow lines so that upon even small movements of the magnet inside the casing a well defined disturbance of the flux in the gaps between the opposing pole pieces of the two magnets occurs and the tendency for the magnet outside the casing to lag in its movements behind those of the magnet within the casing is minimised. Although a substantial attraction occurs between the magnets it is unaccompanied by frictional forces which might adversely affect proper operation, since the arm carrying the magnet outside the casing is supported on pivot springs, whilst the arm carrying the magnet within the casing is mounted on the calibrating spring of leaf form.

The tray 210 is moulded with a metal insert that forms a rearwardly extending arm 222 which extends between two upstanding arms 223 that are formed integrally with the casing cover 73 and are formed with aligned screw-threaded holes into which are screwed respectively two pivot screws 224 adapted to form bearings for a pivot spindle 225 for the pointer 50.

Mounted on the spindle 225 is a pointer moulding 226 in the form of an approximately triangular frame made from lightweight plastic material and formed near an apex of the triangle with a hole 227 through which the spindle 225 extends, the moulding being cemented in position on the spindle near to one end thereof. The pointer 50 is clamped to the moulding 226 by a pinch bolt 228 that extends through a hole 229 formed in the moulding near the base of the triangle and can be drawn into the hole 229 by a nut 230 engaging one face of the moulding, the pointer extending through a transverse hole in the bolt 228 and being drawn by the nut 230 against the face of the moulding opposite to that engaged by the nut. A screw-threaded stud 233 is cemented into a hole 234 in the moulding at the base of the triangle so as to extend transversely of the spindle 225 and carries a pair of locked counterbalance weights 235. A radius spring 240 of C-shape is located at one end by a peg 241 formed on one of the sides of the triangular frame and is cemented to the frame in that position. A single turn wire spring link 242 is hooked onto the free end of the C-spring 240 and extends with the plane of its single turn normal to the axis of spindle 225, the free end of the spring link 242 being hooked into a hole 245 in the arm 222. The C-spring 240 is fitted with an adjusting screw 248 extending through a screw-threaded hole 249 in one arm of the C-spring and arranged to bear against the opposite arm of the C-spring so that by adjustment of the screw 248 the distance between the spindle 225 and the point of attachment of the spring link 242 to the C-spring 240 may be varied. It will be seen that rocking movement of the tray 210 will, through the spring link 242 and the C-spring 240, cause rocking of the moulding 226 about the axis of the spindle 225. The movement imparted to the pointer flag 51 by movement of the tray 210 is thus arcuate about the axis of spindle 225, the force transmitted by the intervening linkage being limited by the spring link 242 and the velocity ratio of the linkage being variable by adjustment, through the screw 248, of the effective radius of the free end of the C-spring 240. The counterbalance weights 235 are adjusted so that no rocking force is exerted upon the tray 210 by the subsequent mechanism at least at one position of the pointer flag 51.

In the use of the instrument assembly, a pair of pressures is applied to the instrument 11 respectively through the nipples 26 and 27 and pressure fluid supplied through nipple 26 to the space 87 below the diaphragm 74 tends to force the rod 94 upwardly and pressure fluid supplied through nipple 27 to the space 89 above the diaphragm 74 tends to force the rod 94 downwardly, so that the resultant force produced on the rod 94 gives an indication of the difference between the two pressures. The position occupied by the rod 94 will depend upon this force, upon the rate of the biassing spring 96, and upon the zero position to which the biassing spring 96 is set by means of the coarse adjusting screw 135 and the fine adjusting screw 149.

Movement of the rod 94 upon change in the difference between the two pressures will be transmitted by the arm 170 and by the magnetic coupling comprising the magnet assemblies 196 and 217 to the spring link 242 and thence through the C-spring 240 and the pointer moulding 226 to the pointer 50 and the flag 51.

Figure 11:
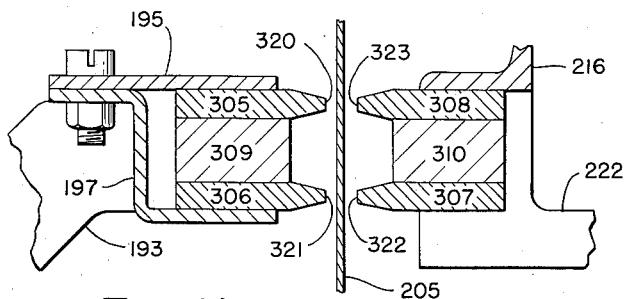
Figure 11 is a sectional side elevation of a detail of a mechanism similar to that shown in Figure 9 showing an alternative form of magnet assembly to a larger scale than that of Figure 9.

In the alternative form of magnet assembly shown in Figure 11, a block of permanent magnet material 309 is sandwiched between an upper pole piece 305 and a lower pole piece 306. The pole pieces are formed from relatively thick sheet iron and at their rearward ends project outwardly from a rear face of the block 309 and are bevelled to form the respective pole faces 320 and 321 of reduced width in the direction of movement of the magnet. The magnet asembly is cemented together and is retained on the shelf 195 by the clip 197. Secured to the magnet tray shelf 216 is a magnet assembly similar to that on shelf 195 and comprising an upper pole piece 308 and a lower pole piece 307 of sheet iron, provided with bevelled ends respectively terminating in the narrow pole faces 323 and 322. Sandwiched between and cemented to the pole pieces 308 and 307 is a block of permanent magnet material arranged so that the bevelled outer ends of the respective pole pieces project outwardly from an end face of the block 310. The upper pole piece is cemented to the tray 216.

Figure 9:
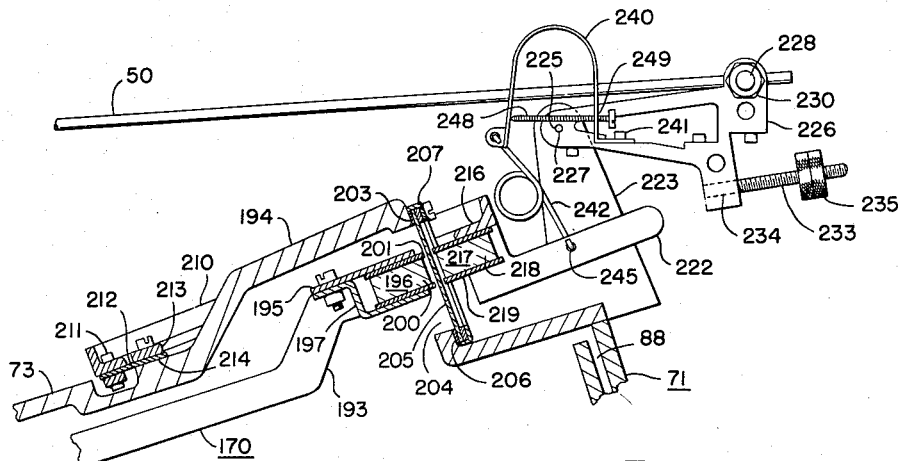
Figure 9 is a sectional side elevation, to a larger scale, of a pointer operating mechanism associated with the instrument shown in Figures 3 to 8, taken on the line 9—9 of Figure 3 and viewed in the direction indicated by the arrows.

The magnet assembly is arranged substantially as has been described with reference to Figure 9 in connection with the magnets 196 and 217, that is the pole faces of the magnet associated with the shelf 195 terminate in the same plane, and the pole faces of the magnet associated with tray 216 terminate in another plane, the respective planes being disposed on opposite sides of the diaphragm 205 so that small clearances exist between the pole faces of the respective magnets and the diaphragm. The pole faces 320 and 321 and the pole faces 322 and 323 are pitched equal distances apart and the blocks of permanent magnet material are so oriented that the upper pole piece 305 and the lower pole piece 307 are of north-seeking polarity whilst the lower pole piece 306 and the upper pole piece 308 are of south-seeking polarity.

By narrowing the ends of the pole pieces to form pole faces of reduced width in the direction of movement of the magnets compared with the thickness of the pole pieces, the flux is further concentrated in the gaps between the pole faces, and the coupling made more sensitve to small movements.

Figure 12:
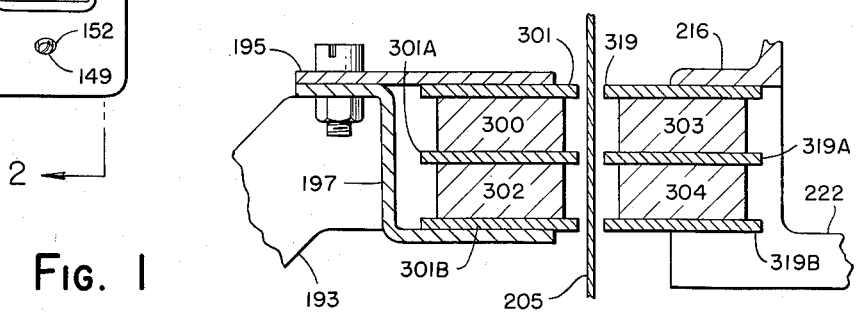
Figure 12 is a similar view to that of Figure 11 showing a further alternative magnet assembly.
Figure 5:
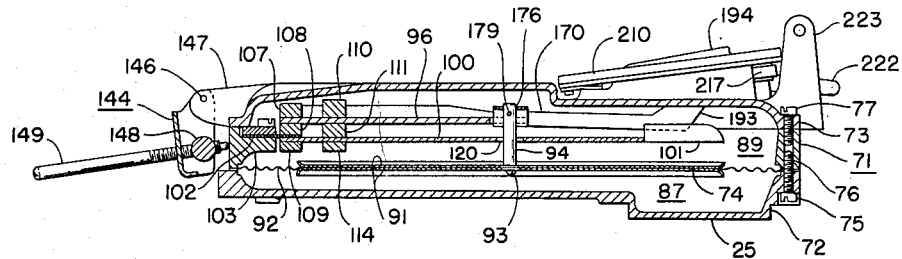
Figure 5 is a sectional side elevation taken on the line 5—5 of Figure 3 and viewed in the direction indicated by the arrows.
Figure 6:
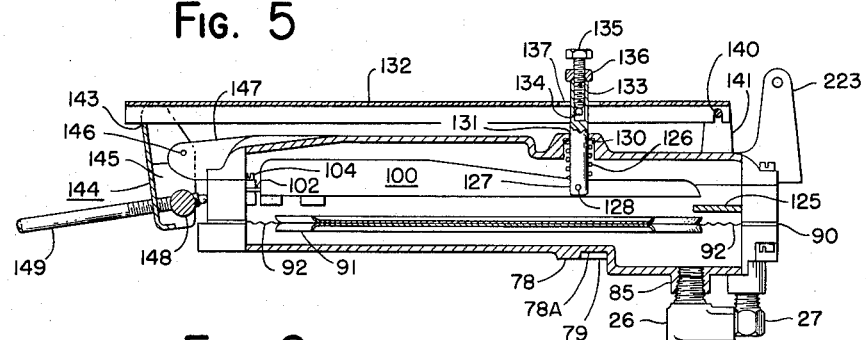
Figure 6 is a sectional side elevation taken on the line 6—6 of Figure 3 and viewed in the direction indicated by the arrows.

In the further alternative form of magnet assembly shown in Figure 12, each magnet is provided with three pole pieces. Thus sandwiched between the shelf 195 and the clip 197 are an upper plate pole piece 301, an upper block of ceramic permanent magnet material 300, a central plate pole piece 301A, a lower block of ceramic permanent magnet material 302 and a lower plate pole piece 301B. Similarly the magnet secured to the tray 216 comprises an upper plate pole piece 319, an upper block of permanent magnet material 303, a central plate pole piece 319A, a lower block 304 of permanent magnet material, and a lower plate pole piece 319B. The blocks of permanent magnet material are of equal thickness and suitably of the ceramic permanent magnet material known as "Magnadure," while the plate pole pieces, also of equal thickness, are suitably of high permeability material such as sheet iron.

The plate pole pieces 301, 301A and 301B extend beyond the edges of the blocks 300 and 302 so that the rearward ends of the pole pieces form narrow pole faces lying in a common plane and arranged with small clearance between the pole faces and the diaphragm 205 as is described in connection with Figure 9 and the magnet 196. The plate pole pieces 319, 319A and 319B similarity extend beyond the edges of the blocks 303 and 304 so that the front ends of the pole pieces form narrow pole faces lying in a common plane and the tray 216 is mounted so that the pole faces have small clearances from the diaphragm 205 as is described in connection with Figure 9.

It is to be noted that the distance between the pole pieces 301, 301A and 301B is equal to that between pole pieces 319, 319A and 319B and that the blocks 300, 302, 303 and 304 of permanent magnet material are so oriented that the upper pole piece 301 and the lower pole piece 301B have north-seeking polarity while the upper pole piece 319 and lower pole piece 319B have south-seeking polarity, and the central pole piece 301A has south-seeking polarity while the central pole piece 319A has north-seeking polarity.

In this arrangement the magnetic coupling between the shelf 195 and the shelf 216 is made stronger and the lag between movement of the shelf and movement of the tray is reduced.

In the instrument assembly described above which forms part of the subject matter of co-pending patent application SN 583,652 filed May 9, 1956, is provided means within a casing adapted to act through a magnetic coupling to effect operation of a device outside the casing. The undesirable forces associated with mechanical means passing through a casing in a fluid tight manner are avoided and the lag between movements of the part of the coupling within the casing, and that part outside is minimised.

It will be clear to one skilled in the art that the instrument described may be adapted to operate as an indicating or/and recording instrument or relay. The arm carrying the magnet outside the casing may be adapted to operate a pointer as has been described, or recording mechanism, or a device for actuating, operating or control means in response to the variable within the casing.

What we claim as new, and desire to secure by Letters Patent of the United States, is:

1. An instrument for manifesting the value of a variable comprising, a sealed metal casing having a window in one wall thereof enclosed by a diaphragm of low permeability material, a pressure sensitive element mounted within said casing for movement in response to variations in a pressure condition, a first lever arm supported on said casing independently of said pressure responsive element and operatively connected to said element for movement therewith, a first permanent magnet assembly mounted on one end of said lever arm and defining at least one magnetic pole in close proximity with one side of said diaphragm, a second lever arm pivotally mounted on the exterior surface of said casing in parallel relationship with said first lever arm and having a portion thereof positioned adjacent to the other side of said diaphragm, a second permanent magnet assembly mounted on said portion and defining at least one magnetic pole in close proximity to said other side of said diaphragm, said magnetic pole of said second assembly having magnetic attraction for said magnetic pole of said first assembly to effect movement of said second lever arm with said first lever arm, an indicator pointer movable relative to a scale therefor, and a spring connection between said second movable lever arm and said pointer to effect movement of said pointer with said second arm.

2. An instrument for manifesting the value of a variable comprising, a sealed metal casing having a window in one wall thereof closed by a diaphragm of low permeability material, a pressure sensitive element mounted within said casing for movement in response to changes in a pressure condition, a first lever arm supported on said casing independently of said pressure sensitive element and having one end operatively connected to said pressure sensitive element for movement therewith and the other end thereof extending toward said diaphragm, a first pair of spaced parallel pole pieces mounted on said other end of said first lever arm and each having an end thereof positioned in close promixity to one side of said diaphragm, a plate of permanent magnet material clamped between said pole pieces, a second lever arm pivotally mounted on the exterior surface of said casing in parallel relationship with said first lever arm and having a portion thereof positioned adjacent said window, a second pair of spaced parallel pole pieces mounted on said portion and each having an end thereof positioned in close proximity to the other side of said diaphragm in alignment with said first pole pieces, a second plate of permanent magnet material clamped between said second pole pieces, said second pair of pole pieces having magnetic attraction with said first pole pieces to effect movement of said second arm with said first arm, an indicating pointer movable relative to a scale therefor, and a spring connection between said second movable arm and said pointer to effect movement of said pointer with movement of said second arm.

3. An instrument for manifesting the value of a variable comprising, a sealed metal casing having a window in one wall thereof closed by a diaphragm of low permeability material, a pressure sensitive element mounted within said casing and movable in response to a change in a pressure condition, an actuating stem extending axially from said pressure sensitive element for movement therewith, a leaf spring having one end supported on said casing and the other end thereof connected to said actuating stem for exerting a biasing force on said pressure sensitive element, a first movable lever arm having one end thereof fixed to said leaf spring to be supported thereby and the other end thereof extending toward said window perpendicular to the plane thereof, a permanent magnet assembly mounted on said other end of said first lever arm and defining a pair of magnetic poles positioned in close proximity to said diaphragm, a second lever arm pivoted on the exterior surface of said casing in parallel overlying relationship with said first lever arm, said second lever arm having a right angled portion extending parallel to said diaphragm, a second magnet assembly mounted on said right angled portion of said second lever arm and defining a pair of magnetic poles positioned in close prox-imity to the other side of said diaphragm, said second magnet assembly having attraction with said first assembly to effect movement of said second lever arm with said first lever arm, an indicating pointer movable relative to a scale therefor, and a spring connection between said second movable arm and said pointer to effect movement of said pointer with movement of said second arm.

4. An instrument for manifesting the value of a variable comprising, a sealed metal casing having a window in one wall thereof closed by a diaphragm of low permeability material, a pressure sensitive element mounted within said casing and movable in response to a change in a pressure condition, a first lever arm pivotally mounted on said casing and operatively connected to said pressure sensitive element for movement therewith, said first lever arm having one end thereof extending toward said diaphragm substantially perpendicular to the plane thereof, a permanent magnet assembly mounted on said one end of said first lever arm and positioned in close proximity to said diaphragm, a second lever arm pivoted on the exterior surface of said casing in parallel overlying relationship with the said first lever arm, said second lever arm having an extending right angled portion parallel to said diaphragm, a second permanent magnet assembly mounted on said right angled portion of said second lever arm in close proximity to the other side of said diaphragm, said second magnet assembly having magnetic attraction to said first assembly to effect movement of said second lever arm with said first lever arm, an indicating pointer movable relative to a scale therefor, and a spring connection between said second movable arm and said pointer to effect movement of said pointer with movement of said second arm.

5. An instrument as claimed in claim 4 wherein said first lever arm is pivotally mounted on a leaf spring having one end thereof fixed to said casing and the other end thereof fixed to said first lever arm.

6. An instrument for manifesting the value of a variable comprising, a sealed metal casing having a window in one wall thereof closed by a diaphragm of low permeability material, a pressure sensitive element mounted within said casing for movement in response to variations in a pressure condition, a leaf spring having one end supported on said casing and the other end thereof operatively connected to said pressure sensitive element for exerting a biasing force thereon, a first lever arm having one end fixed to said leaf spring and the other end thereof extending toward said diaphragm, a first permanent magnet assembly mounted on said other end of said first lever arm in close proximity with one side of said diaphragm, a second lever arm pivotally mounted on the exterior surface of said casing and having a portion thereof positioned adjacent to the other side of said diaphragm, a second permanent magnet assembly mounted on said portion of said second lever arm in close proximity to the other side of said diaphragm, said second magnet assembly having magnetic attraction with said first magnet assembly to effect movement of said second lever arm wtih said first lever arm, an indicator pointer movable relative to a scale therefor, and a spring connection between said second movable lever arm and said pointer to effect movement of said pointer with said second arm.

References Cited in the file of this patent

UNITED STATES PATENTS

| 2,090,160 | Spiteglass et al. | Aug. 17, 1937 |
| 2,386,505 | Puchy | Oct. 9, 1945 |
| 2,551,212 | Howe | May 1, 1951 |
| 2,577,165 | Thorsheim | Dec. 4, 1951 |
| 2,613,246 | Spodig | Oct. 7, 1952 |
| 2,659,151 | Lee | Nov. 17, 1953 |
| 2,727,192 | Rinia | Dec. 13, 1955 |